US006204758B1

United States Patent
Wacker et al.

(10) Patent No.: US 6,204,758 B1
(45) Date of Patent: Mar. 20, 2001

(54) SYSTEM TO AUTOMATICALLY DETERMINE WHEEL POSITION FOR AUTOMOTIVE REMOTE TIRE MONITORING SYSTEM

(75) Inventors: Carl E. Wacker, Waterford, WI (US); Mona Ann Carver, Charlotte, NC (US); Jeffrey A. Schultz, Pittsville; Scott Scarborough, Altavista, both of VA (US)

(73) Assignee: Schrader-Bridgeport International, Inc., Buffalo Grove, IL (US)

( * ) Notice: Subject to any disclaimer, the term of this patent is extended or adjusted under 35 U.S.C. 154(b) by 0 days.

(21) Appl. No.: 09/360,469

(22) Filed: Jul. 23, 1999

(51) Int. Cl.[7] .................................................. B60C 23/00
(52) U.S. Cl. ...................... 340/444; 340/442; 340/447; 340/669; 73/121; 73/146.5
(58) Field of Search .................................. 340/442, 444, 340/445, 446, 447, 448, 669; 303/190; 73/146.5, 146.8, 121

(56) References Cited

U.S. PATENT DOCUMENTS

| 3,768,374 | * 10/1973 | Ito et al. | 91/419 |
|---|---|---|---|
| 4,574,267 | 3/1986 | Jones | 340/58 |
| 4,609,905 | 9/1986 | Uzzo | 340/58 |
| 5,109,213 | 4/1992 | Williams | 340/447 |
| 5,231,872 | 8/1993 | Bowler et al. | 73/146.5 |
| 5,483,827 | 1/1996 | Kulka et al. | 73/146.5 |
| 5,541,574 | * 7/1996 | Lowe et al. | 340/447 |
| 5,559,484 | 9/1996 | Nowicki et al. | 340/447 |
| 5,562,787 | 10/1996 | Koch et al. | 156/64 |
| 5,589,815 | 12/1996 | Nishihara et al. | 340/444 |
| 5,600,301 | 2/1997 | Robinson, III | 340/442 |
| 5,602,524 | 2/1997 | Mock et al. | 340/447 |
| 5,686,662 | * 11/1997 | Tracht et al. | 73/121 |
| 5,721,528 | * 2/1998 | Boesch et al. | 340/442 |
| 5,764,138 | * 6/1998 | Lowe | 340/447 |
| 5,815,070 | * 9/1998 | Yoshikawa | 340/439 |
| 5,825,286 | * 10/1998 | Coulthard | 340/447 |
| 5,895,433 | * 4/1999 | Chen et al. | 701/41 |
| 6,037,748 | * 6/1998 | Yee et al. | 320/127 |
| 6,043,738 | * 3/2000 | Stewart et al. | 340/447 |

* cited by examiner

*Primary Examiner*—Daniel J. Wu
*Assistant Examiner*—Phung Nguyen
(74) *Attorney, Agent, or Firm*—Brinks Hofer Gilson & Lione (57) ABSTRACT

A tire monitor (100) for use in a remote tire monitor system (1000) includes an accelerometer (902, 904, 906) for detecting acceleration of the tire monitor. Position information for the tire monitor is determined in response to the acceleration. In this manner, tire position information is determined automatically to allow the system to display tire characteristic data such as air pressure in conjunction with tire position.

11 Claims, 5 Drawing Sheets

SYSTEM TO AUTOMATICALLY DETERMINE WHEEL POSITION FOR AUTOMOTIVE REMOTE TIRE MONITORING SYSTEM

BACKGROUND

The present invention relates generally to wheel position determination in a remote tire monitoring system.

Remote tire monitoring systems have been developed using radio technology to provide centralized tire pressure information to an operator of a vehicle. Such systems typically include a plurality of sending units or transmitters associated with the tires of a vehicle, such as an automobile, truck or other wheeled vehicle, along with a receiving unit. The transmitters measure a tire characteristic, such as tire air pressure, and communicate data corresponding to the tire characteristic to the receiving unit. The receiving unit takes some action in response to the data, such as providing an alarm or providing a display indicative of the tire characteristic for the operator of the vehicle.

In order for the receiving unit to reliably indicate the tire characteristic, the receiving unit preferably associates the tire characteristic data with a tire position on the vehicle. This association is made upon initial installation of tires on the vehicle and must be repeated each time tire position is changed, such as after tire rotation.

U.S. Pat. No. 5,600,301, assigned to the assignee of the present application, discloses a tire pressure monitoring system that includes sending units associated with each tire of a vehicle and a central receiving unit. Each of the sending units includes a respective radio frequency (RF) transmitter that transmits an RF signal, including both an identifier code and an indicator of tire pressure. Additionally, each of the sending units includes a magnet sensor. When the receiving unit is placed in a learn mode, a magnet is used to activate each sending unit of the vehicle in a predetermined order. The receiving unit learns the identifiers associated with the respective tires based upon the sequence of activation of the sending units. This approach has been found reliable in use, but it requires the user to have a suitable magnet for sequentially activating the sending units.

In one patent application assigned to the assignee of the present application, a remote tire pressure monitoring system includes a sending unit for each monitored tire. The sending units transmit RF signals including an identifier and a pressure indicator. A receiver operates in a learn mode in which the receiver associates specific identifiers either with the vehicle or with specific tires. During the learn mode, the vehicle is driven at a speed above a threshold speed and identifiers are associated with either the vehicle or the respective tires of the vehicle only if they persist for a selected number of signals or frames during the learning period. In one example, the tires are inflated with different pressures according to a predetermined pattern and the pressure indicators of the receive signals are used to associate individual tire positions with the respective sending units.

Other techniques for programming a receiving unit with tire position information involve manual entry of the information. This has been done by using a keypad to enter both the tire monitor identification information and tire position information. This has also been done by using a bar code reader to read the tire monitor identification information directly from the tire monitor while still manually entering the tire position information.

The approaches discussed above are not fully automatic and an automatic technique is desired to improve reliability and convenience for the user.

SUMMARY

By way of introduction only, the method and apparatus of the following description learns the position of tire monitors attached to a vehicle by detecting acceleration of the tire monitors and determining from acceleration data the position of the tire monitors on a vehicle. Position on the left or right of the vehicle can be discerned from the polarity of the acceleration data, indicating direction of acceleration. Position on the front or rear of the vehicle can be discerned from yaw acceleration data associated with steering of the front wheels. Position on the front or rear of the vehicle can also be discerned by programming all tire monitors to transmit a position signal having a first value. Subsequently, at installation or after rotation, only the tire monitors on a predetermined front or rear end of the vehicle are set to transmit the position signal with a second value.

The foregoing discussion of the preferred embodiments has been provided only by way of introduction. Nothing in this section should be taken as a limitation on the following claims, which define the scope of the invention.

DETAILED DESCRIPTION OF THE PRESENTLY PREFERRED EMBODIMENTS

Figures 1, 2, 3:
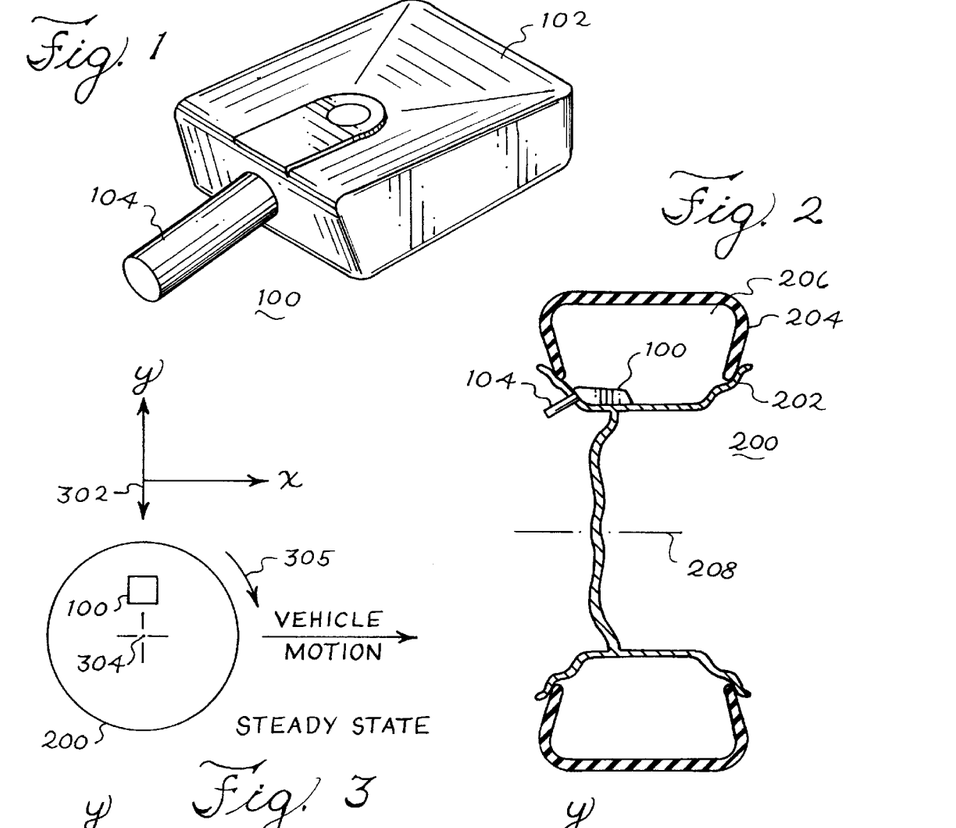
FIG. 1 is a perspective view of a tire monitor.
FIG. 2 is a cross-sectional view of a wheel of a vehicle.
FIG. 3, FIG. 4 and FIG. 5 illustrate acceleration of the wheel of FIG. 2 during different operating conditions.

Referring to the drawing, FIG. 1 shows a perspective view of a tire monitor 100. The tire monitor 100 includes a housing 102 and a valve stem 104. The tire monitor 100 is configured for mounting on a wheel of a vehicle. When so mounted, the tire monitor 100 senses a tire characteristic and produces data representative of the tire characteristic. In the preferred embodiment, the tire monitor 100 senses air pressure of the tire. The valve stem 104 opens to admit air for filling the tire and for manual checks of tire pressure. Otherwise, the valve stem 104 generally remains closed to seal the tire. The housing 102 contains mechanical and electrical components for detecting tire pressure or other tire characteristics and producing an indication thereof. Structure and operation of the tire monitor 100 will be provided in further detail in connection with FIG. 9 below.

FIG. 2 is a cross-sectional view of a wheel 200 of a vehicle. The wheel 200 includes a rim 202 and a tire 204 mounted thereon. A tire monitor 100 is mounted on the wheel 200 for monitoring a tire characteristic, such as tire pressure. The tire monitor 100 is mounted within a cavity 206 formed between the rim 202 and the tire 204 so that only the valve stem 104 extends outside the cavity. The tire monitor 100 is mounted on the rim 202 spaced from the centerline 208 of the wheel 200 a distance sufficient for detection at the tire monitor 100 of acceleration of the wheel 200 and the tire monitor 100.

Figures 4, 5:
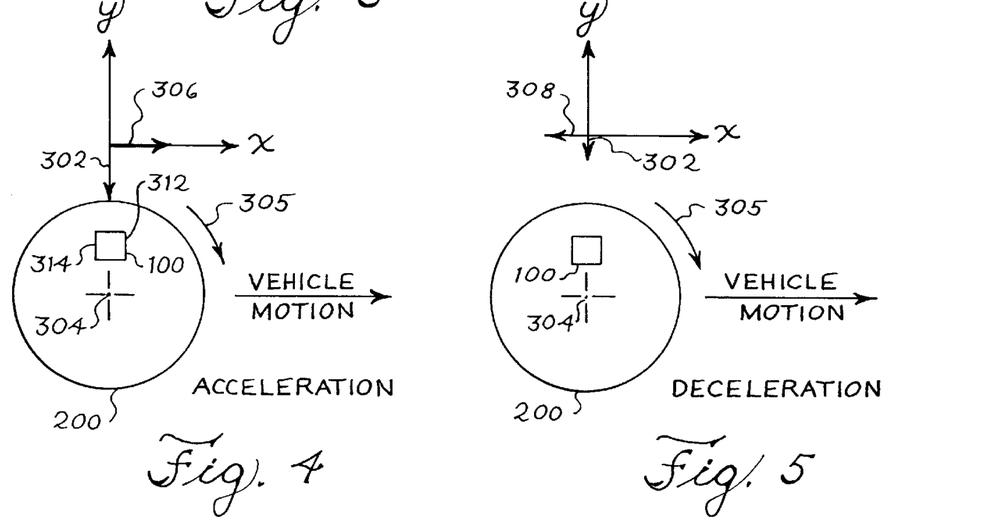

FIG. 3, FIG. 4 and FIG. 5 illustrate acceleration of the wheel 200 of FIG. 2 during different operating conditions. As is illustrated in these figures, tires mounted on a vehicle experience acceleration which can be detected at a tire monitor. The polarity of the acceleration varies in accordance with the location of the tire monitor on the right or left side of the vehicle. The acceleration information can be used to determine position of the tire monitor and its associated wheel on the vehicle.

FIG. 3, FIG. 4 and FIG. 5 show a wheel 200. The wheel 200 has a tire monitor 100 mounted thereon. The wheel 200 is mounted on a vehicle which is not illustrated in the drawing so as not to unduly complicate the figure. The vehicle is moving in the direction indicated in the drawing. In each of FIG. 3, FIG. 4 and FIG. 5, x-y axes are shown to illustrate acceleration experienced by the tire monitor 100 in the plane of rotation of the wheel 200. On the axes, arrows indicate the direction of acceleration. The length of the arrow indicates magnitude of the acceleration.

FIG. 3 illustrates the wheel 200 in a steady state condition. In FIG. 3, the vehicle, including the wheel 200, is moving at an unchanging rate of speed. In this situation, the only acceleration experienced at the tire monitor 100 is radial acceleration shown by the arrow 302. The acceleration is in the direction of the center 304 of the wheel 200 and has a constant magnitude. Because the wheel 200 is at steady state, there is no acceleration tangential to the wheel 200.

FIG. 4 illustrates the wheel 200 during wheel acceleration. In FIG. 4, the vehicle including the wheel 200 is moving in the indicated direction and its velocity in that direction is increasing. The tire rotates in the direction indicated by the arrow 305. In FIG. 4, an arrow 302 directed toward the center 304 of the wheel 200 indicates that the tire monitor 100 continues to experience radial acceleration due to wheel rotation. In FIG. 4, the length of the arrow 302 is greater than the length of the arrow 302 in FIG. 3 to indicate that the radial acceleration is greater as velocity of the vehicle increases. In addition to radial acceleration, the tire monitor 100 experiences tangential acceleration as indicated by arrow 306, due to the variation in the speed of the wheel 200 and the tire monitor 100. The arrow 306, like the acceleration it represents, is directed in the same direction as the increase in speed of the vehicle.

FIG. 5 illustrates acceleration experienced by the tire monitor 100 during wheel deceleration. In FIG. 5, the vehicle including the wheel 200 is moving in the indicated direction and its velocity in that direction is decreasing. In FIG. 5, arrow 302 indicates that the tire monitor 100 still experiences radial acceleration, directed toward the center 304 of the wheel 200. In FIG. 5, the length of the arrow 302 is shorter than in FIG. 4 to indicate that the magnitude of the radial acceleration is reduced due to tire wheel deceleration. In addition, arrow 308 indicates that the tire monitor 100 experiences an additional component of acceleration due to the deceleration of the wheel 200 and the tire monitor 100. The arrow 308 and the acceleration it represents are directed in a direction opposite the vehicle motion to indicate that the vehicle and the tire monitor 100 are decelerating.

The magnitude of the radial acceleration and tangential acceleration experienced by a wheel and its associated tire monitor will be substantially the same at all wheels of the vehicle, regardless of the position of the wheel on a vehicle. Variations in the magnitude of the acceleration will occur only during acceleration and deceleration. Thus, acceleration magnitude will be the same if the wheel is located at the left front, right front, right rear or left rear of the vehicle.

However, tire monitors on opposing sides of the vehicle will experience oppositely directed tangential acceleration. During acceleration, a tire monitor mounted on a tire on the left side of the vehicle will experience acceleration as illustrated in FIG. 4. Acceleration will be in the direction of the arrow 306, toward the right side 310 of the tire monitor 100. The tire rotates in the direction indicated by the arrow 305. For a tire monitor mounted on a wheel on the right side of the vehicle, all directions will be reversed relative to the illustration in FIG. 4. Tire rotation will be in the direction opposite that indicated by the arrow 305. Acceleration will be of the same magnitude as indicated by the arrow 306 but in an opposite direction, toward the left side 314 of the tire monitor 100.

Therefore, a method for providing position information for a tire in a remote tire monitoring system includes the steps of detecting acceleration of the tire and transmitting information derived from the acceleration to a remotely located receiver. Acceleration is detected using an accelerometer. The tire monitor may transmit data or a signal representing the acceleration. Alternatively, the acceleration may be processed at the tire monitor and processed data may be transmitted. In yet another alternative, the tire monitor itself may determine position information from the acceleration and transmit the position information to the receiver. All of these possibilities and others not specifically enumerated here are encompassed by the expression "transmit data or a signal representing the acceleration." The tire monitor and the receiver can determine position of the tire monitor and its associated wheel on the vehicle from the acceleration information.

In one example, the sign of the detected tangential acceleration will correspond to the side of the vehicle, with positive acceleration indicating location on the left side of the vehicle and negative acceleration indicating location on the right side of the vehicle. Once the receiver learns the sign of the acceleration and its associated side of the vehicle (right side or left side), the receiver can subsequently associate tire characteristic data received from that tire monitor with the position information appropriate for that tire monitor.

The acceleration information will vary if the vehicle is moving in reverse. The tire monitors will detect an acceleration that is in the opposite direction of the expected acceleration for a forward-moving vehicle. This will result in erroneous readings, for example, when the vehicle begins its journey by initially backing, then proceeding in the forward direction.

To overcome this limitation, in one embodiment, the tire monitor 100 averages acceleration data over a predetermined time, such as two minutes. In another embodiment, the tire monitor waits a predetermined time duration before transmitting the acceleration information. In yet another embodiment, the tire monitor stores previous acceleration data corresponding to movement in the standard direction. If the detected acceleration does not correspond to movement in this direction, the tire monitor suspends transmission of acceleration data until the detected acceleration matches the stored acceleration information. This ensures the reliability of the acceleration information used by the system.

Figure 6:
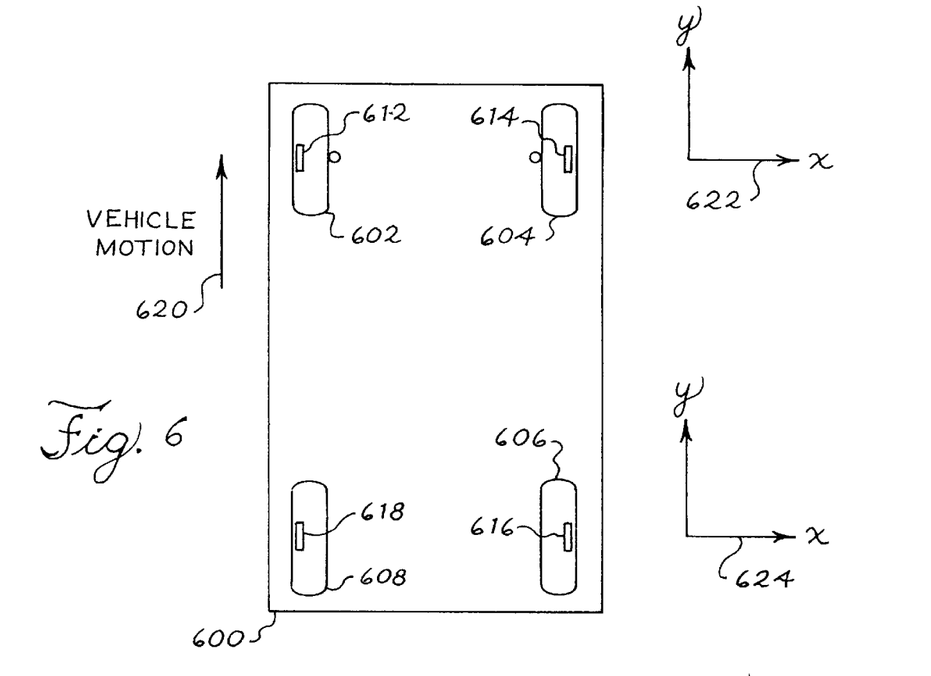
FIG. 6, FIG. 7 and FIG. 8 illustrate acceleration of wheels of a vehicle during different operating conditions.
Figure 7:
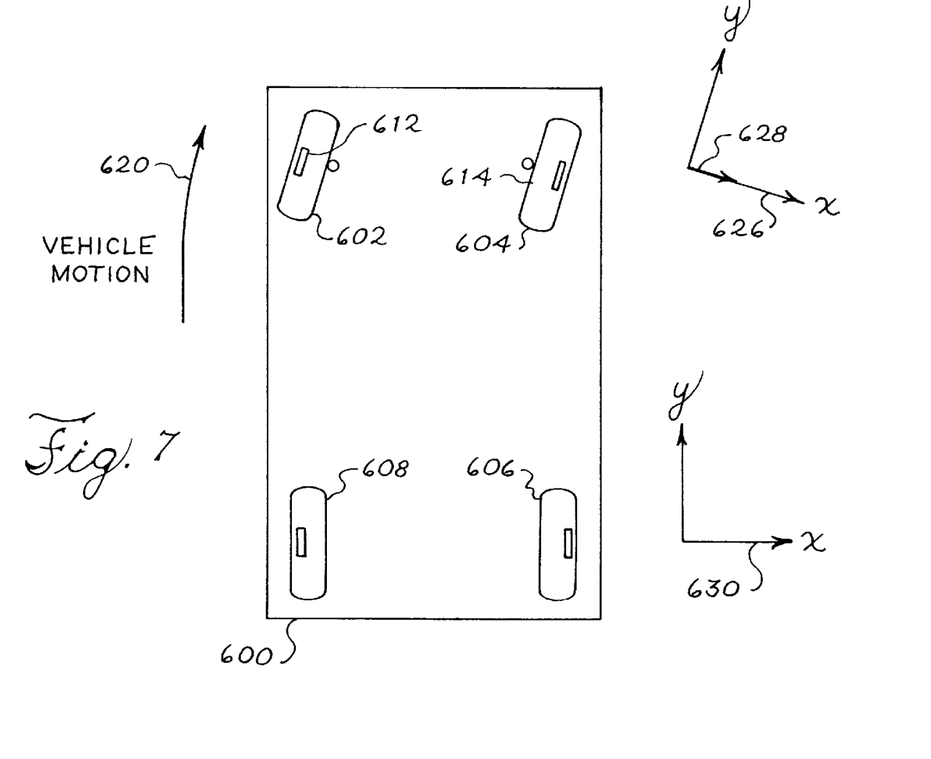
Figure 8:
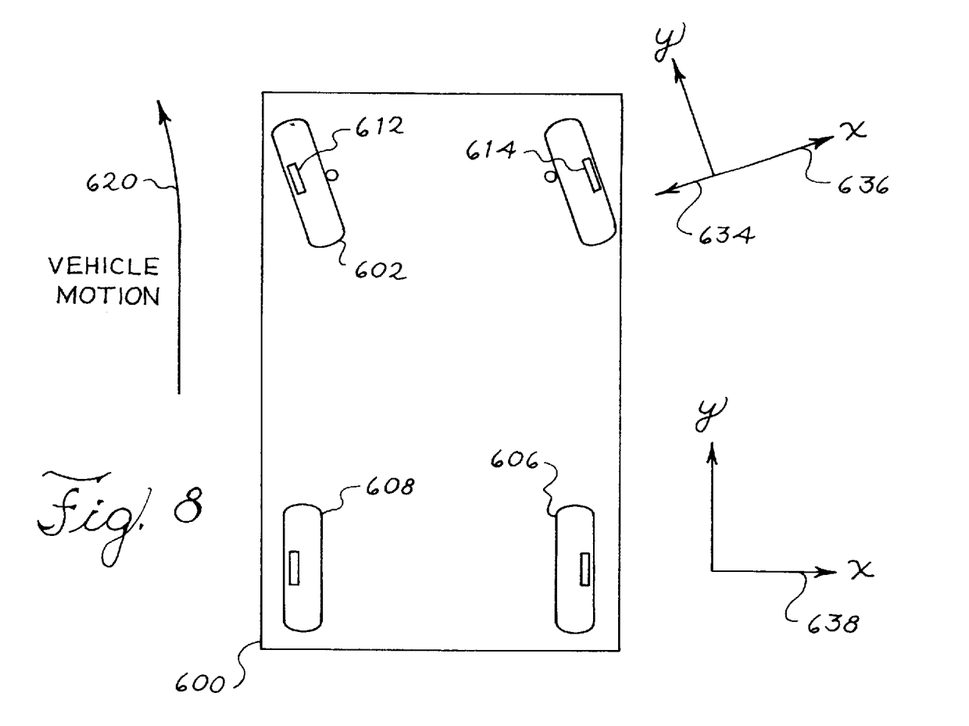

FIG. 6, FIG. 7 and FIG. 8 illustrate acceleration of wheels of a vehicle during different operating conditions. As illustrated in these figures, tire monitors associated with front, steering wheels of a vehicle may detect yaw acceleration which is not experienced by tire monitors located at rear, non-steering wheels of the vehicle. Yaw acceleration occurs as steering wheels turn from side to side in the plane parallel to the roadway on which the vehicle travels.

FIG. 6 illustrates a vehicle 600 having four wheels 602, 604, 606 608. Each wheel has associated therewith a tire monitor. Thus, wheel 602 has an associated tire monitor 612; wheel 604 has an associated tire monitor 614; wheel 606 has an associated tire monitor 616; and wheel 608 has an associated tire monitor 618. Provision of a tire monitor at each wheel is exemplary only. In other embodiments, some wheels may omit tire monitors. However, provision of a tire monitor with each wheel may be preferred so as to make each wheel substantially identical and interchangeable.

In FIG. 6, the vehicle 600 is moving in the direction indicated by arrow 620. FIG. 6 further illustrates x-z axes which illustrate acceleration experienced by wheels of the vehicle. First x-z axes 622 illustrate acceleration experienced by wheel 604, a front, steering wheel of the vehicle. Second x-y axes 624 illustrate acceleration experienced by wheel 606, a rear, non-steering wheel of the vehicle 600. In FIG. 6, since the vehicle is moving in a straight line as indicated by the arrow 620, neither tire monitor 614 nor tire monitor 616 experiences acceleration in the illustrated plane, as is illustrated by x-z axes 622 and x-z axes 624.

In contrast, FIG. 7 illustrates the vehicle 600 as the vehicle 600 turns to the right. Vehicle motion is illustrated by the arrow 620. To turn to the right, the front wheels 602, 604 turn to the right. This turning motion requires pivoting about an axis perpendicular to the x-axis and the z-axis of the x-z axes 626 in FIG. 7. This pivoting introduces a yaw acceleration which is detected as acceleration in the z direction, illustrated by the arrow 628 on the x-z axes 626. The rear wheels 606,608, which do not pivot or turn, experience no yaw acceleration. This is illustrated on the axes 630.

FIG. 8 illustrates yaw acceleration experienced by tire monitor 612 and tire monitor 614 during a turn to the left by the vehicle 600. Here, wheels 602, 604 turn to the left, causing the vehicle 600 to move to the left as illustrated by the arrow 632 showing vehicle motion. The turning of wheels 602, 604 introduces yaw acceleration at the tire monitors 612 and the tire monitor 614. This yaw acceleration is illustrated by the arrow 634 on the axes 636. As is illustrated by the axes 638, the rear wheels, wheel 606 and wheel 608, do not experience yaw acceleration.

Accordingly, by detecting acceleration experienced only by the front wheels, tire monitors associated with the front wheels can determine that they are positioned on a front wheel of a vehicle. In a vehicle, such as an automobile or truck in which the front wheels are used for steering, the front wheels and their associated tire monitors experience a yaw acceleration which is not experienced at the rear wheels. By detecting the yaw acceleration and producing data indicative of the yaw acceleration, a tire monitor can determine that it is mounted on the front or steering wheels of a vehicle.

By yaw acceleration is meant the acceleration due to yawing of the steering wheels 602, 604 of the vehicle. As the vehicle turns, the vehicle yaws and all wheels experience this vehicle yaw. However, only the front, steering wheels are free to yaw through action of the steering linkage of the vehicle 600 and therefore only they experience yaw acceleration therefrom.

Combined with an ability to determine position on a right side or left side of a vehicle, as illustrated in FIGS. 3 through 5, the tire monitor can determine its position at one of the four corners of a vehicle. By conveying information derived from acceleration along different axes, such as radial acceleration, tangential acceleration or yaw acceleration, a receiver mounted on or near the vehicle is provided with information that can be used to determine the position of the tire monitor. This position information can be associated with tire characteristic data, such as tire pressure, to provide useful tire pressure and position information to a user.

Figures 9, 11:
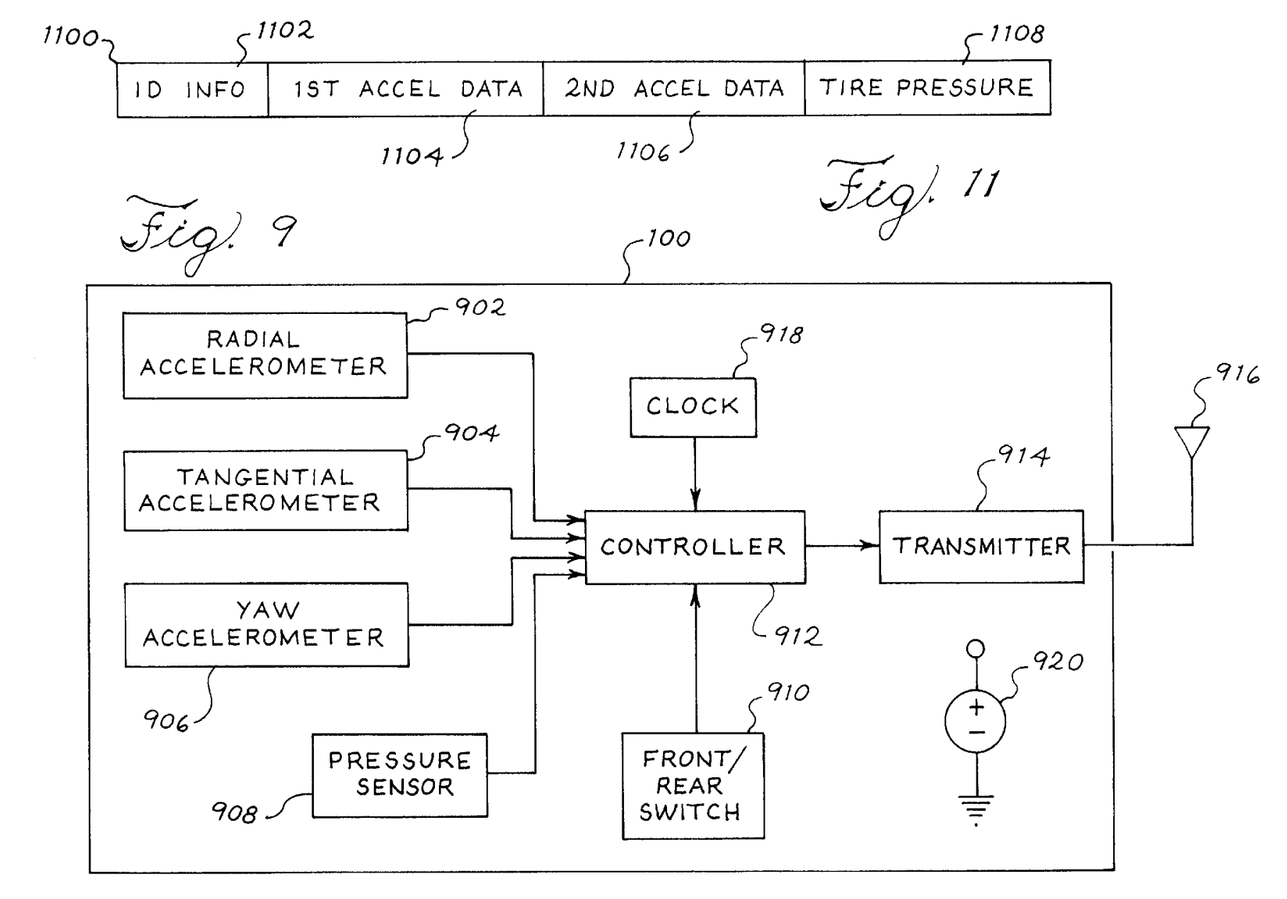
FIG. 9 is a block diagram of a tire monitor.
FIG. 11 illustrates a message format for communication in the remote tire monitor system of FIG. 10.

FIG. 9 is a block diagram of a tire monitor 100. In the illustrated embodiment, the tire monitor 100 includes a radial accelerometer 902, a tangential accelerometer 904, a yaw accelerometer 906, a pressure sensor 908, a front/rear switch 910, a controller 912, a transmitter 914 and an antenna 916. The tire monitor further includes a clock circuit 918 for maintaining a time base and a battery 920 for powering the tire monitor 100. The components of the tire monitor 100 are contained within a housing 102. In alternative embodiments, the tire monitor may include or omit various of these components to suit a particular application. The tire monitor 102 is suitable for use in the applications illustrated above in conjunction with FIGS. 1 through 8.

The radial accelerometer 902 is configured to detect acceleration in a radial direction. Radial acceleration is illustrated by arrow 302 in FIG. 3. The radial accelerometer 902 may be any suitable accelerometer which produces data indicative of acceleration along a first axis, such as the y-axis in FIG. 3. An example of a suitable accelerometer is a single pole accelerometer, model ADXL105, available from Analog Devices, Inc., Norwood, Mass. In one embodiment, the radial accelerometer 902 may comprise a roll switch which detects rolling of the tire to indicate motion of the vehicle and provides an indication to the controller 912. The indication may be provided when vehicle speed exceeds a predetermined threshold.

Tangential accelerometer 904 produces data indicative of acceleration along a second axis, such as the x-axis of FIG. 3. Thus, the tangential accelerometer 904 detects tangential acceleration of the tire on which the tire monitor 100 is mounted. Preferably, the data produced by the tangential accelerometer 904 includes at least an indication of the polarity or direction of acceleration. The data may also include an indication of magnitude of acceleration, as well. Alternatively, the tangential accelerometer may provide as an acceleration signal a voltage or current representative of tangential acceleration detected by the tangential accelerometer 904. Acceleration data or an acceleration signal produced by the tangential accelerometer 904 is provided to the controller 912. An example of a suitable accelerometer is a single pole accelerometer, model ADXL105, available from Analog Devices, Inc., Norwood, Mass.

The yaw accelerometer 906 produces data indicative of acceleration along a third axis, such as the z-axis of FIG. 7 and FIG. 8. In particular, the yaw accelerometer 906 is configured to detect acceleration due to yawing of the wheel on which the tire monitor 100 is mounted. The yaw accelerometer 906 provides acceleration data or an acceleration signal to the controller 912. An example of a suitable accelerometer is a dual pole accelerometer, models ADXL202 or ADXL210, available from Analog Devices, Inc., Norwood, Mass.

The pressure sensor 908 forms a sensor configured to produce data representative of a tire characteristic. In the illustrated embodiment, the pressure sensor 908 is a tire pressure sensor and the tire characteristic is pneumatic pressure of the tire. In other embodiments, the detected tire characteristic may be tire temperature, number of tire rotations, or other characteristics. The pressure sensor 908 produces sensor data or a sensor signal indicative of the tire characteristic for provision to the controller 912.

The front/rear switch 910 is configured to provide an output signal having a first value until the front/rear switch 910 detects an external stimulus. The front/rear switch 910 provides the output signal having a second value in response to this external stimulus in response to this external stimulus. By detecting differences in the output signal produced by front/rear switches at different tire monitors on the vehicle, a receiver can distinguish tire position data for the tire monitor 100. Thus, the front/rear switch 910 forms a respective position indicator at the tire monitor 100.

In the preferred embodiment, all tire monitors, such as the tire monitor 100, are manufactured with a front/rear switch 910 which produces an output signal having a constant first value unless altered by the external stimulus. Apparatus to provide the external stimulus is then provided near some of the tire monitors on a vehicle. For example, if the front/rear switch 910 responds to magnetic stimulus, magnets may be appropriately mounted on the rear wheels or in the rear wheel wells of the vehicle to continuously apply the magnetic stimulus. A suitable magnetic switch is model number HE313500, from The Cherry Corporation, Waukegan, Ill., or model number AD22151 from Analog Devices, Inc., of Norwood, Mass. In response, the front/rear switch 910 of the tire monitors at the rear wheel switches and begins producing the output signal with a second value. The tire monitors at the front wheels continue to produce the output signal with the first value. All four tire monitors transmit data indicative of the output signal from the front/rear switch 910. A receiver receives the data and distinguishes tire monitor position based on the output signal from the front/rear switch 910.

The magnet or other stimulus apparatus can be mounted near the front wheels rather than the rear wheels. The front/rear switch 910 can be alternatively used to distinguish right and left positioning of tire monitors by mounting the stimulus apparatus on the right or left side of the vehicle. A combination of two switches such as front/rear switch 910 at each tire monitor can be used to identify positions of up to four tire monitors.

This embodiment has the advantage of automatically producing the correct tire position information even after the wheels of the vehicle have been rotated. A tire monitor on a wheel which was formerly mounted at the rear of the vehicle and produced the output signal with the second value due to the external stimulus there will change and begin producing the output signal with the first value when moved to the front of the vehicle and the stimulus is no longer present.

The controller 912 controls operation of the tire monitor 100. In one embodiment, the controller 912 comprises a microcontroller and a memory for storing data and instructions for operating the tire monitor 100. In particular, the controller 912 receives data or signals from the radial accelerometer 902, the tangential accelerometer 904, the yaw accelerometer 906, the pressure sensor 908 and the front/rear switch 910 and formats this data as a message for transmission to a remote receiver. The message may also include identification information for the tire monitor 100. The message is provided to the transmitter 914 which, in conjunction with the antenna 916, transmits radio signals to the remote receiver. In an alternative embodiment, the tire monitor 100 further includes a receiver for receiving radio communications to provide two-way communication for the tire monitor 100.

Figure 10:
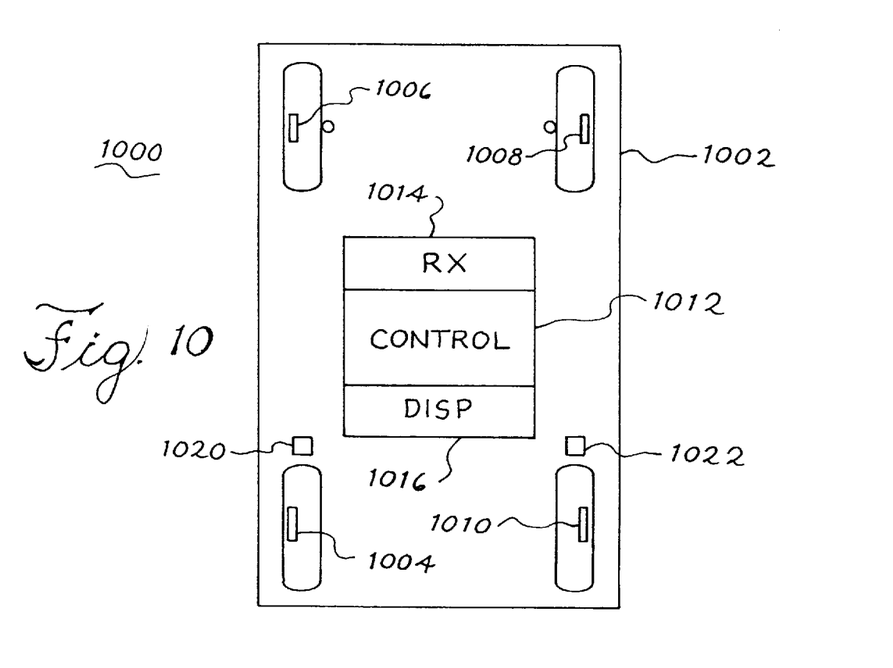
FIG. 10 is a block diagram of a remote tire monitor system.

FIG. 10 is a block diagram showing a remote tire monitoring system 1000 in conjunction with a vehicle 1002. The vehicle 1002 is illustrated as a four-wheeled vehicle, but in other embodiments can have any number of wheels. The remote tire monitoring system 1000 includes a first tire monitor 1004, a second tire monitor 1006, a third tire monitor 1008 and a fourth tire monitor 1010. Each tire monitor is associated with a respective wheel of the vehicle. The remote tire monitor system further includes a controller 1012, the controller 1012 including a receiver 1014 and a display 1016.

The tire monitors of the system 1000 are configured to detect data representative of a tire characteristic of the tire associated with each monitor and to provide the tire characteristic data to the receiver 1014. Further, the tire monitors are configured to detect acceleration along one or more axes at the tire monitor and provide acceleration data to the receiver 1014. The acceleration data may be data indicative of radial acceleration, tangential acceleration or yaw acceleration, as described above.

For communicating between the controller 1012 and the tire monitors of the system 1000, the system 1000 further includes a plurality of exciters, including exciter 1020 and exciter 1022. The exciters are preferably positioned near the respective tire monitors, for example in the wheel well adjacent the tire to be monitored. In one embodiment, the exciters provide the external stimulus required to actuate the front/rear switch of the associated tire monitor. In such an embodiment, the exciter comprises a magnet or radio transmission circuit which provides the necessary stimulus. In another embodiment, the exciters receive radio transmissions from the respective tire monitors and communicate received data to the controller 1012 via an electrical connection with the controller 1012. Alternatively, the exciters include a transmission circuit to communicate data and commands to the tire monitors to control the respective tire monitors.

In an alternative embodiment, the exciters are omitted and each tire monitor transmits its data using radio frequency transmissions. The transmission is conveyed directly to the receiver 1014 of the controller 1012 for subsequent processing. The tire monitors may also transmit identification information.

At the controller 1012, the receiver 1014 receives data indicative of tire characteristic and the acceleration data from each tire monitor. The controller 1012 processes the data to associate each tire monitor with a position on the vehicle 1002 and to associate the tire characteristic data with the tires. The controller 1012 produces on the display 1016 an indication of tire status based on the received data. The indication may be a simple warning light for each tire or may be more complex graphical or textual data to indicate conditions at each tire.

FIG. 11 illustrates a format of a message 1100 for communication in the remote tire monitoring system 1000 of FIG. 10. The message 1100 communicates data from a tire monitor to the receiver of the system 1000.

The message 1100 includes a plurality of data fields, including an identification information field 1102, a first acceleration data field 1104, a second acceleration data field 1106 and a tire characteristic data field 1108. The identification information field 1102 includes data which uniquely identifies the transmitting tire monitor in the system. The first acceleration data field 1104 is data indicative of acceleration along a first axis, such as radial acceleration, tangential acceleration or yaw acceleration as described above. The second acceleration data field 1106 is data indicative of acceleration along a second axis. The tire characteristic data field 1108 is data indicative of a tire characteristic, such as tire pressure, detected by the tire monitor.

The message 1100 may include other fields not illustrated in the embodiment of FIG. 11. For example, the message 1100 may include more acceleration data fields or a field for conveying data indicative of the state of the front/rear switch of the tire monitor. Also, the message 1100 may include a field for conveying communication reliability information, such as a checksum.

Figure 12:
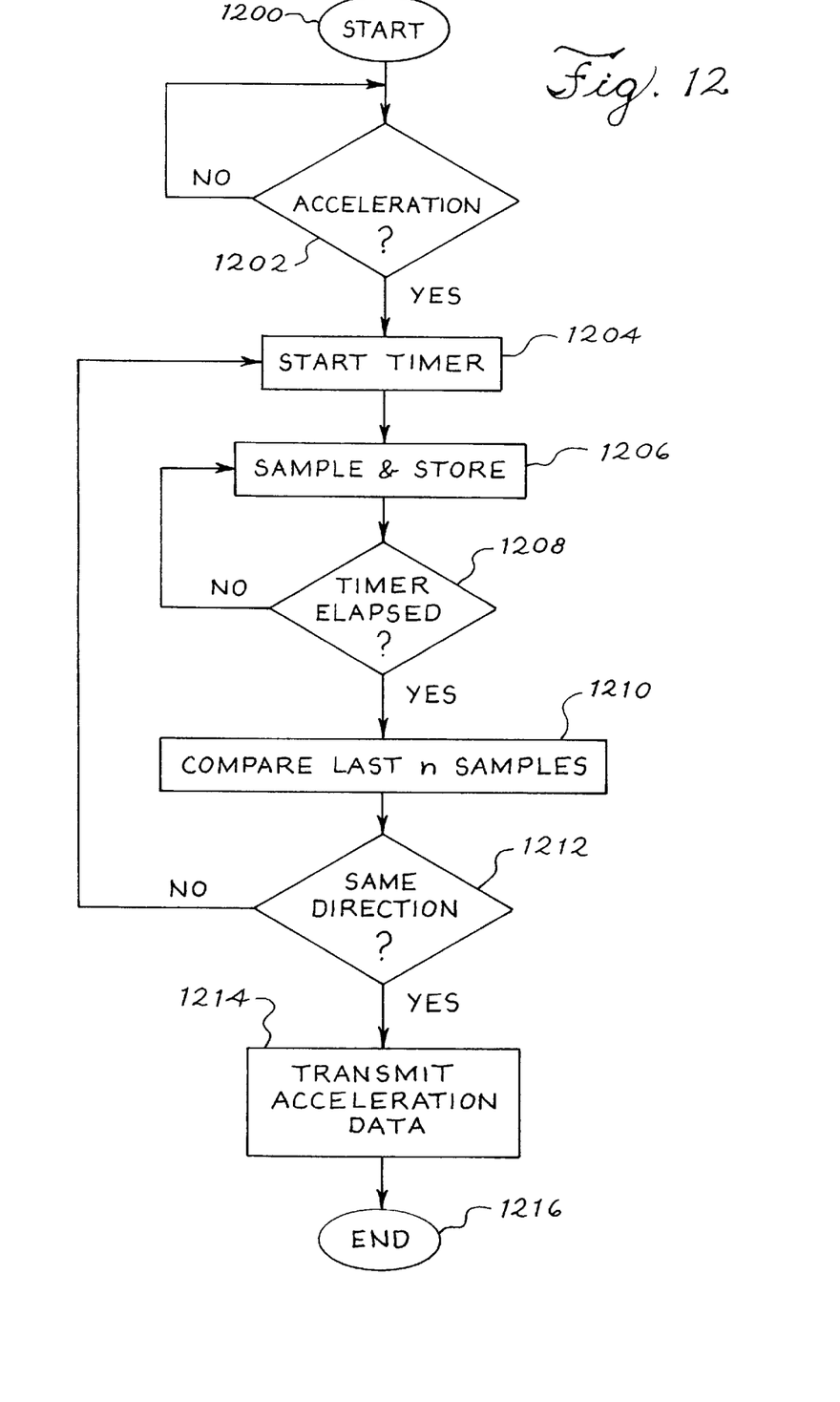
FIG. 12 is a flow diagram illustrating a method for obtaining position information in a remote tire monitoring system.

FIG. 12 is a flow diagram illustrating a method for obtaining position information in a remote tire monitoring system. The illustrated method is suitable for use in conjunction with a tire monitor as illustrated in FIGS. 1, 2 and 9 above. The method may be performed at a tire monitor or at the receiver in a remote tire monitoring system. The method begins at step 1200.

At step 1202, it is determined if the tire monitor experiences acceleration. This can be determined by detecting the output of an accelerometer included with the tire monitor. The method continues in a loop until acceleration is detected. When acceleration is detected, at step 1204 a timer is started and at 1206 data indicative of acceleration are sampled and stored. At step 1208, it is determined if the timer has elapsed. The timer may time a duration of, for example, three seconds. This eliminates false acceleration readings that may occur, for example, when a vehicle including the tire monitor initially backs away from a parking space before beginning forward motion. The method continues sampling acceleration data in a loop including steps 1206 and 1208 until the timer elapses.

At step 1210, upon exiting the loop, recent samples of data are compared to determine if the acceleration is consistent. For example, as described above, acceleration data for one wheel may have one polarity when the vehicle is accelerating forward and opposite polarity when the vehicle is accelerating backward. One polarity may be expected by the tire monitor and considered a normal condition. The acceleration data are compared to ensure the data consistently has the normal polarity. A predetermined number of samples, such as n=10 samples, may be compared. Alternatively, samples corresponding to an elapsed time duration such as three seconds may be compared. Any suitable number of samples may be compared.

If the data do not indicate the normal polarity, indicating that the direction of acceleration has recently changed and that the acceleration data may be unreliable, control returns to step 1204 to collect additional data. If the data are consistent, at step 1214 the acceleration data are transmitted for further processing. The method ends at step 1216.

From the foregoing, it can be seen that the present embodiment provides a method and apparatus for automatically providing tire position information in a remote tire monitoring system. Each tire monitor in the system detects acceleration of the tire monitor. The position of the tire monitor and its associated tire are determined from the acceleration. Acceleration data can be used to distinguish front from rear positioning and left from right positioning. In an alternative embodiment, each tire monitor is manufactured with a position indicator such as a front/rear switch. This indicator is set to provide a first output signal unless actuated by external stimulus. Apparatus such as a magnet is positioned on the vehicle near some of the tire monitors to actuate position indicators of those tire monitors to provide a second output indication. The output of the position indicators is used to determine the position of the tire monitors on the vehicle.

While a particular embodiment of the present invention has been shown and described, modifications may be made.

For example, each tire monitor may be operated as a transponder responsive only to input signals provided by an associated exciter to measure acceleration and tire characteristics and provide information to a central controller in a tire monitoring system. It is therefore intended in the appended claims to cover all such changes and modifications which fall within the true spirit and scope of the invention.

What is claimed is:

1. A method for operating a remote tire monitor system, the system including a plurality of tire monitors associated with tires of a vehicle and a receiver, the method comprising steps of:
   (a) at a first tire monitor of the remote tire monitor system, detecting an acceleration of the first tire monitor;
   (b) transmitting first data derived from the acceleration of the first tire monitor;
   (c) at a second tire monitor of the remote tire monitor system, detecting an acceleration of the second tire monitor;
   (d) transmitting second data derived from the acceleration of the second tire monitor;
   (e) at the receiver, receiving the first data and the second data; and
   (f) determining respective position of the first tire monitor and the second tire monitor from the first data and the second data.

2. A method as recited in claim 1 wherein step (f) comprises the steps of determining one of a right side position and a left side position on the vehicle for each of the first tire monitor and the second tire monitor.

3. A method as recited in claim 2 wherein step (f) further comprises the steps of determining one of a front position and a rear position on the vehicle for each of the first tire monitor and the second tire monitor.

4. A method as recited in claim 1 further comprising the steps of:
   (g) maintaining respective position indicators at each of the first tire monitor and the second tire monitor, the respective position indicators being changeable from a first value to a second value in response to an external stimulus;
   (h) providing the external stimulus to only one of the first tire monitor and the second tire monitor;
   (i) transmitting position data related to the values of the respective position indicators from each of the first tire monitor and the second tire monitor;
   (j) receiving the position data at the receiver; and
   (k) determining respective position of the first tire monitor and the second tire monitor from the position data.

5. The method of claim 4 wherein step (h) comprises the step of passing a magnet near the one of the first tire monitor and the second tire monitor.

6. The method of claim 4 wherein step (h) comprises the step of transmitting a radio frequency signal for reception by the one of the first tire monitor and the second tire monitor.

7. The method of claim 1 further comprising the steps of:
   (g) periodically transmitting data representative of a respective tire characteristic from each of the first tire monitor and the second tire monitor; and
   (h) associating the data representative of a respective tire characteristic with the respective position of the first tire monitor and the second tire monitor.

8. The method of claim 7 further comprising the steps of
   (i) producing a user indication including tire position and tire status in response to the data representative of a respective tire characteristic and the respective position of the first tire monitor and the second tire monitor.

9. A remote tire monitoring system comprising:
a plurality of tire monitors associated with wheels of a vehicle, each tire monitor configured to detect acceleration of the tire monitor and transmit acceleration data; and
a receiver mounted on the vehicle to receive the acceleration data, the receiver determining a tire monitor position on the vehicle for each tire monitor in response to the acceleration data.

10. The remote tire monitoring system of claim 9 wherein each tire monitor comprises a first accelerometer for detecting acceleration along a first axis and producing first acceleration data and a second accelerometer for detecting acceleration along a second axis and producing second acceleration data.

11. The remote tire monitoring system of claim 9 wherein each tire monitor comprises a respective position indicator which is changeable from a first value to a second value in response to an external stimulus, the tire monitor configured to transmit a value of the respective position indicator, the receiver determining the tire monitor position on the vehicle for each tire monitor in response to the value of the respective position indicator.

* * * * *